(12) United States Patent
Guilley et al.

(10) Patent No.: US 11,733,966 B2
(45) Date of Patent: Aug. 22, 2023

(54) PROTECTION SYSTEM AND METHOD

(71) Applicant: SECURE-IC SAS, Cesson-Sevigne (FR)

(72) Inventors: Sylvain Guilley, Paris (FR); Thibault Porteboeuf, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 298 days.

(21) Appl. No.: 16/954,064

(22) PCT Filed: Dec. 18, 2018

(86) PCT No.: PCT/EP2018/085646
§ 371 (c)(1),
(2) Date: Jun. 16, 2020

(87) PCT Pub. No.: WO2019/121780
PCT Pub. Date: Jun. 27, 2019

(65) Prior Publication Data
US 2021/0165633 A1 Jun. 3, 2021

(30) Foreign Application Priority Data
Dec. 22, 2017 (EP) ...................................... 17306928

(51) Int. Cl.
*G06F 7/501* (2006.01)
*G06F 7/76* (2006.01)
(Continued)

(52) U.S. Cl.
CPC .............. *G06F 7/501* (2013.01); *G06F 7/508* (2013.01); *G06F 7/764* (2013.01); *G06F 21/602* (2013.01)

(58) Field of Classification Search
CPC ........... H04L 2209/04; H04L 2209/046; H04L 2209/08; H04L 2209/12; H04L 9/003;
(Continued)

(56) References Cited

U.S. PATENT DOCUMENTS

| | | | |
|---|---|---|---|
| 2007/0188355 A1* | 8/2007 | Baek | ....................... H04L 9/003 341/51 |
| 2012/0163585 A1* | 6/2012 | Choi | ....................... H04L 9/002 380/28 |

FOREIGN PATENT DOCUMENTS

| | | |
|---|---|---|
| GB | 2 443 357 A | 4/2008 |
| RU | 2 372 643 C2 | 11/2009 |
| RU | 2372643 C2 * | 11/2009 |

OTHER PUBLICATIONS

Mangard, et al., "Power Analysis Attacks: Revealing the Secrets of Smart Cards", Springer, 2007.
(Continued)

*Primary Examiner* — Matthew D Sandifer
(74) *Attorney, Agent, or Firm* — BakerHostetler

(57) ABSTRACT

A device of executing a cryptographic operation on bit vectors, the execution of the cryptographic operation includes the execution of at least one arithmetic addition operation between a first operand and a second operand. Each operand comprises a set of components, each component corresponding to a given bit position of the operand. The device comprises a set of elementary adders, each elementary adder being associated with a given bit position of the operands and being configured to perform a bitwise addition between a component of the first operand at the given bit position and the corresponding component of the second operand at the given bit position using the carry generated by the computation performed by the elementary adder corresponding to the previous bit position. Each elementary adder has a sum output corresponding to the
(Continued)

100 bitwise addition and a carry output, the result of the arithmetic addition operation being derived from the sum outputs provided by each elementary adder. The device is configured to apply a mask to each operand component input of at least some of the elementary adders using a masking logical operation, the mask being a random number.

14 Claims, 9 Drawing Sheets

(51) Int. Cl.
  *G06F 21/60* (2013.01)
  *G06F 7/508* (2006.01)
(58) Field of Classification Search
  CPC ........... H04L 9/0869; G06F 2207/7219; G06F 2207/7238; G06F 21/60; G06F 21/755
  See application file for complete search history.

(56) References Cited

OTHER PUBLICATIONS

Prouff, et al., "A Generic Method for Secure SBox Implementation", Conference: Information Security Applications, 8th International Workshop, WISA 2007, pp. 227-244, 2007.

Rivest, "The RC5 Encryption Algorithm", International Workshop on Fast Software Encryption (FSE), pp. 86-96, 1994.

Buchmann, et al., "XMSS—A Practical Forward Secure Signature Scheme Based on Minimal Security Assumptions", Lecture Notes in Computer Science, Post-Quantum Cryptography, pp. 117-129, 2011.

Bernstein, et al., "SPHINCS: practical stateless hash-based signatures", Lecture Notes in Computer Science, Advances in Cryptology—EUROCRYPT 2015, pp. 368-397, 2015.

Goubin, "A Sound Method for Switching between Boolean and Arithmetic Masking", CHES 2001, Cryptographic Hardware and Embedded Systems—CHES 2001, vol. 2162 of Lecture Notes in Computer Science, pp. 3-15, 2001.

Coron, et al., "Secure Conversion between Boolean and Arithmetic Masking of Any Order", Cryptographic Hardware and Embedded Systems—CHES 2014, vol. 8731, 2014.

Nikova, et al., "Threshold Implementations Against Side-Channel Attacks and Glitches", International Conference on Information and Communications Security, vol. 4307 of LNCS, pp. 529-545, 2006.

Dinu, et al., "Efficient Masking of ARX-Based Block Ciphers Using Carry-Save Addition on Boolean Shares", Lecture Notes in Computer Science, vol. 10599, pp. 39-57, 2017.

Schneider, et al., "Arithmetic Addition over Boolean Masking Towards First- and Second-Order Resistance in Hardware", Lecture Notes in Computer Science, Jan. 9, 2016.

* cited by examiner

PROTECTION SYSTEM AND METHOD

CROSS-REFERENCE TO RELATED APPLICATIONS

This application is a National Stage of International patent application PCT/EP2018/085646, filed on Dec. 18, 2018, which claims priority to foreign European patent application No. EP 17306928.7, filed on Dec. 22, 2017, the disclosures of which are incorporated by reference in their entirety.

TECHNICAL FIELD

The invention generally relates to computer system securing and, in particular, to systems, methods, and computer program products for protecting cryptographic algorithm against attacks.

BACKGROUND

A major challenge in modern computer systems is the protection of sensitive information. In an attempt to protect sensitive information, several encryption algorithms were developed. An encryption algorithm (also called "cipher") refers to a series of cryptographic operations, executed in an encryption and/or decryption process, which transforms plaintext or other readable information into unintelligible ciphered text tiphertexf. A cryptographic algorithm is associated with a key (string of bits such as a number or a word for instance) which is used to encrypt and/or decrypt data. In an encryption process, the encryption algorithm combines the information to be protected with a key, thereby resulting in encrypted data. In a decryption process, the encryption algorithm combines the encrypted data with a secret key, thereby resulting in decrypted data. The encryption algorithm generates a different result for different keys or different information.

An encryption algorithm is intended to prevent or at least make as difficult as possible the decryption of a generated ciphertext without the use of the secret key. Accordingly, information can only be decrypted if the key used for decryption matches with the key used for encryption (both keys may be same of linked).

Encryption algorithms include symmetric encryption algorithms (also called "secret key" algorithms) and asymmetric encryption algorithms (also called "public key" algorithms). While symmetric encryption algorithms use the same key for encryption and decryption (or derive the decryption key from the encryption key), asymmetric encryption algorithms use a different key for encryption and decryption.

The arithmetic operations performed to execute the encryption algorithm must be secured against non-invasive attacks that attempt to correlate the leakage of some operations with a hypothetic model. Such attacks target compromising the key to decrypt communications, forge signatures, perform unauthorized transactions, etc.

Non-invasive attacks can use power and timing measurements to extract the cryptographic key. The power measurement techniques rely on the data-dependent energy behavior of the underlying system. Exemplary non-invasive attacks include power analysis attacks. Power analysis can be used to identify the specific portions of the program being executed to induce timing glitches that may be used to bypass key checking.

A known solution to protect the arithmetic operations against such attacks threat is masking as described in Stefan Mangard, Elisabeth Oswald, and Thomas Popp. Power Analysis Attacks: Revealing the Secrets of Smart Cards. Springer, December 2006. ISBN 0-387-30857-1. Masking schemes can be used to make the power consumption less dependent of the intermediate values of the cryptographic algorithm. "Masking" refers to a change of the intermediate variables of the computation into randomized versions which are thus decorrelated from the unprotected variables, each being a potential target for a side-channel attack.

In particular, in the field of symmetrical encryption, the mainstream approach consists in using purely Boolean structures. This is the case of widely used and standardized ciphers, such as DES (Data Encryption Standard) and AES (Advanced Encryption Standard). In both DES and AES examples, most cryptographic operations (except from simple data move, which does not leak by itself) are implemented using XORs and in look-up-tables (LUTs). It is therefore natural to restrict to so-called Boolean masking, where the only operation in terms of masking is the XOR. This is innately compatible with the functional XOR operations, and LUTs are also easy to protect, e.g., using recomputation as disclosed in Emmanuel Prouff and Matthieu Rivain. A Generic Method for Secure SBox Implementation. In Sehun Kim, Moti Yung, and Hyung-Woo Lee, editors, WISA, volume 4867 of Lecture Notes in Computer Science, pages 227-244.Springer, 2007.

However, some other symmetrical encryption algorithms, such as IDEA (International Data Encryption Algorithm) or RC5 (Ronald L. Rivest. The RC5 Encryption Algorithm. In FSE, pages 86-96,1994) mix Boolean and arithmetic operations.

Other ciphers which mix Boolean and arithmetic functions include ciphers termed 'lightweight', which have recently emerged as adapted solutions for Internet of Things (IoT). Exemplary lightweight ciphers include Chaskey block ciphers such as HIGHT, LEA (Link Encryption Algorithm), TEA (Tiny Encryption Algorithm), XTEA (eXtended TEA), GOST revisited, SEA (Scalable Encryption Algorithm).

Many cryptographic hash functions also rely both on Boolean and arithmetic functions, such as SHA-2 and SHA-3. They can be used in modes of operation where they involve a secret, such as HMAC. In particular, existing approaches also define hash-based signatures, which have the advantage of being post-quantum, such as disclosed for example in:

XMSS: Buchmann, Johannes; Dahmen, Erik; Hülsing, Andreas (2011). "XMSS—A Practical Forward Secure Signature Scheme Based on Minimal Security Assumptions". Lecture Notes in Computer Science. Springer Berlin Heidelberg. 7071 (Post-Quantum Cryptography. PQCrypto 2011): 117-129. ISSN 0302-9743. doi: 10.1007/978-3-642-25405-5_8.

SPHINCS: Bernstein, Daniel J.; Hopwood, Daira; Hülsing, Andreas; Lange, Tanja; Niederhagen, Ruben; Papachristodoulou, Louiza; Schneider, Michael; Schwabe, Peter; Wilcox-O'Hearn, Zooko (2015). Oswald, Elisabeth; Fischlin, Marc, eds. "SPHINCS: practical stateless hash-based signatures". Lecture Notes in Computer Science. Springer Berlin Heidelberg. 9056 (Advances in Cryptology—EUROCRYPT 2015): 368-397. ISBN 9783662467992. doi:10.1007/978-3-662-46800-5_15.

Arithmetic operations are usually additions on n-bits, modulo $2^n$ (two to the power of n) to handle the overflows. When n is large (n»8 such as n=16 or n=32), implementing the addition in a table is prohibitive. The common approach in such case lies on an invocation of a masking translation from Boolean to arithmetic (and vice-versa). Exemplary approaches are described in:

Louis Goubin. A Sound Method for Switching between Boolean and Arithmetic Masking. In Çetin Kaya Koç, David Naccache, and Christof Paar, editors, CHES, volume 2162 of Lecture Notes in Computer Science, pages 3-15. Springer, 2001.

Jean-Sébastien Coron, Johann Großschädl, and Praveen Kumar Vadnala. Secure Conversion between Boolean and Arithmetic Masking of Any Order. In Lejla Batina and Matthew Robshaw, editors, cryptographic Hardware and Embedded Systems—CHES 2014-16th International Workshop, Busan, South Korea, Sep. 23-26, 2014. Proceedings, volume 8731.

However, masking conversion from Boolean to arithmetic is costly in terms of time.

To allow masking in the same run of Boolean and arithmetic operations, some masking schemes have been proposed, such as the threshold implementation disclosed in Svetla Nikova, Christian Rechberger, and Vincent Rijmen. Threshold Implementations Against Side-Channel Attacks and Glitches. In ICICS, volume 4307 of LNCS, pages 529-545. Springer, Dec. 4-7 2006. Raleigh, N.C., USA. Such scheme is dedicated to hardware implementations with strong assumptions on independence between modules and a need for careful pipeling.

However, conventional masking approaches are agnostic on the operations being carried out and thus suffer from large overheads.

There is consequently a need for improved systems, methods, and computer program products for masking cryptographic operations that improve protection of cryptographic systems against attacks.

SUMMARY

In order to address these and other problems, there is provided a device for executing a cryptographic operation on bit vectors, the execution of the cryptographic operation comprising the execution of at least one arithmetic addition operation between a first operand and a second operand, each operand being an integer of a given bit size and representing a bit vector. Each operand comprises a set of components, each component corresponding to a given bit position of the operand. The device comprises a set of elementary adders, each elementary adder being associated with a given bit position of the operands and being configured to perform a bitwise addition between a component of the first operand at the given bit position and the corresponding component of the second operand at the given bit position using the carry generated by the computation performed by the elementary adder corresponding to the previous bit position, each elementary adder having a sum output corresponding to the bitwise addition and a carry output, the result of the arithmetic addition operation being derived from the sum outputs provided by each elementary adder. The device is configured to apply a mask to each operand component input of at least some of the elementary adders using a masking logical operation.

Advantageously, the mask may be random.

In an embodiment, the device may be configured to apply different masks to different sets of elementary adders, each set comprising connected elementary adders.

In an embodiment, the device may comprise at least two sets of elementary adders, each set of elementary adder being applied a different mask. The device may comprise a mask switching unit arranged between the output of a previous set of elementary adders which is applied a mask and the input of a next set of elementary adders, the mask switching unit being configured to apply a new mask to the next set of elementary adders and to provide the carry output of the last elementary adder of the previous set of elementary adders, to the first elementary adder of next set of elementary adders.

Each mask switching unit may comprise at least two XOR logical gates.

Each mask switching unit may comprise at least two XOR logical gates, the first XOR logical gate comprising a first XOR logical gate configured to receive the new mask and the carry output of the last elementary adder of the previous set of elementary adders, the second XOR logical gate receiving the mask of the previous set of elementary adders and the output of the first XOR logical gate, the output of the second XOR logical gate being connected to the input of the first elementary adder of next set of elementary adders.

In an embodiment, a same mask is applied to each elementary adder.

In an embodiment, the masking logical operation used to apply a mask to each operand component input may be a XOR logic operation between the mask and the operand component input.

In an embodiment, each elementary adder may be a full adder.

In an embodiment, each elementary adder may be a carry look-ahead adder.

There is further provided a method of executing a cryptographic operation on bit vectors, the execution of the cryptographic operation comprising the execution of at least one arithmetic addition operation between a first operand and a second operand, each operand being an integer of a given bit size and representing a bit vector, each operand comprising a set of components, each component corresponding to a given bit position of the operand, the method comprising, for each bit position of the operands performing a bitwise addition between a component of the first operand at the bit position and the corresponding component of the second operand at the bit position, using the carry generated by the addition of the bit components of the operand at the previous bit position, the bitwise addition providing a sum output corresponding to the bitwise addition and a carry output, the result of the arithmetic addition operation being derived from the sum outputs provided by each elementary adder, the step of performing a bitwise addition previously comprising applying a mask to each operand bit component using a masking logical operation.

Embodiments of the invention provide a lightweight masking scheme, such masking scheme being advantageously secure at chosen order and adapted for arithmetic operations. The proposed masking scheme makes it possible to enhance the security of the cryptosystem against non-invasive attacks.

Another advantage of embodiments of the present invention is to obviate the need for masking conversion, thereby limiting the overall cost of the operation implementation.

The above summary presents a simplified summary in order to provide a basic understanding of some aspects of the systems and/or methods discussed herein. This summary is not intended to provide an extensive overview of the systems and/or methods discussed herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Additionally, the detailed description is supplemented with an Exhibit 1:

Exhibit 1 is an exemplary application of the masking method to mask the algorithm TEA (Tiny Encryption Algorithm).

This Exhibit is placed apart for the purpose of clarifying the detailed description, and of enabling easier reference. It nevertheless forms an integral part of the description of the present invention. This applies to the drawings as well.

A portion of the disclosure of this patent document may contain material which is subject to copyright protection.

DETAILED DESCRIPTION

Figure 1:
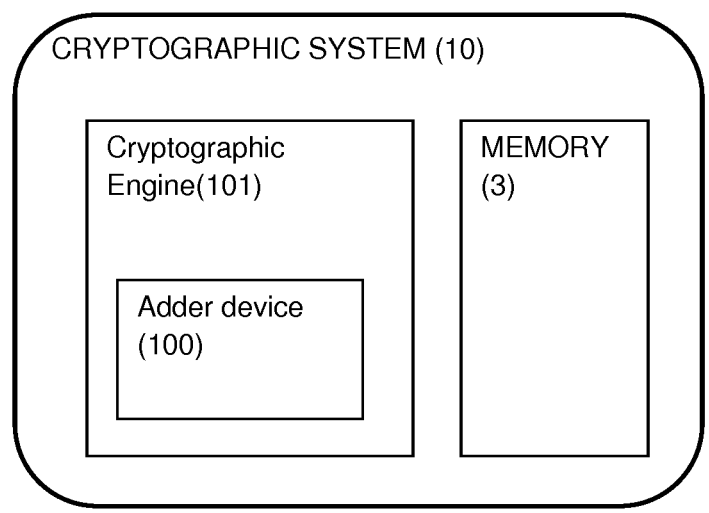
FIG. 1 depicts an operating environment in accordance with embodiments of the invention.

Referring to FIG. 1, an operating environment 1 in accordance with embodiments of the invention is shown. The operating environment may include a cryptographic system ("cryptosystem") 10 implementing one or more cryptographic mechanisms to ensure security, authentication, protection and privacy of data during the storage and/or the transmission of the data. The cryptographic mechanisms may employ cryptographic keys in order to generate ciphered data (also referred to as "ciphertext") from original data (also referred to as "plaintext") to prevent attacker from recovering the original data, while access to the input data requires access to the cryptographic keys used to encrypt the original data through a decryption mechanism. The cryptographic system 10 may be for example a cryptographic system which implements a cryptographic mechanism for public key encryption/decryption.

The cryptographic system 10 may comprise a cryptographic engine 11 configured to execute a cryptographic operation related to the cryptographic mechanism while protecting such execution from attacks. The cryptographic operation may be implemented by any cryptographic algorithm comprising Boolean and/or Arithmetic operations, such as for example DES, AES, IDEA, RC5 or SHA. The cryptographic operation comprises at least one arithmetic addition a+b between a first binary operand a and a second binary operand b, the operands being bits integers of a given bit size and representing a bit vectors (also referred to as "data blocks"). The bit vectors represent data blocks, such as intermediate states of the cryptographic algorithm.

The operands may be of same or of different bit sizes. The following description of some embodiments will be made with reference to operands of same bit size n for illustration purpose only, although the skilled person will readily understand that the invention also applies to operands of different size (in such case, the smaller operand can be for example padded with zeros to apply the invention to operands having same bit width).

In cryptographic operations, plain data is encrypted by chaining operations involving a secret (e.g., a key), in such a way the result reveals little (unexploitable) information on the plain data and on the secret. Such operations may consist in linear and/or non-linear operations, which break down in the manipulation of intermediate bit width, such as nibbles (bit vectors of 4 bits), bytes (bit vectors of 8 bits), words (bit vectors of 16 bits), double words (bit vectors of 32 bits), quad-words (bit vectors of 64 bits), etc. The bit vectors (or 'data blocks') represented by operands a and b may be such words of limited bit width allow to use efficiently the logic and arithmetic operations (e.g., assembly instructions) in processors or in general purpose machines (e.g., hardwired look-up tables or "digital signal processors" embedded into Field Programmable Gates Array (FPGAs)).

The cryptographic engine 11 may comprise an adder device 100 configured to execute each arithmetic addition a+b. The arithmetic addition may be defined over the integers (the set of integers is noted $\mathbb{Z}$ in mathematical notations) or over the ring of integers modulo $2^n$, noted $\mathbb{Z}/2^n\mathbb{Z}$.

To facilitate understanding of some embodiments described hereinafter, the following definitions are provided.

Considering two integers $a=(a_{n-1}; \ldots ; a_0)_2$ and $b=(b_{n-1}; \ldots ; b_0)_2$, each of the two integers a and b being a n-bit integer, represented as a string of bits, an arithmetic addition refers to a sequence of bitwise operations defined as follows, for $i=0, \ldots, n-1$:

$$d_i = a_i \oplus b_i \oplus c_i \quad (1)$$

with:

$$c_{i+1} = \text{MAJ}(a_i, b_i, c_i) \quad (2)$$

where $c_i$ is initially set to 0 ($c_0=0$), when adding a and b (this operation is also referred to as ADD in assembly languages), or when $c_i$ is the value of the incoming carry in case of a pipelined addition $a+b+c_0$ (this operation is also referred to as ADDC in assembly languages).

It should be noted that integers $a=(a_{n-1}; \ldots ; a_0)$ and $b=(b_{n-1}; \ldots ; b_0)$ both fit on n bits, meaning that $0 \leq a \leq (2^n-1)$ and $0 \leq b \leq (2^n-1)$.

As the incoming carry $c_0$ is a bit $0 \leq c_0 \leq 1$, it comes:

$$0 \leq a+b+c_0 \leq (2^n-1)+(2^n-1)+1 = 2^{n+1}-1$$

As a result, $a+b+c_0$ fits on (n+1) bits.

As $a+b+c_0=(c_n; d_{n-1}; \ldots ; d_0)_2$ or $a+b+c_0=(d_n; d_{n-1}; \ldots ; d_0)_2$ using the convention that $d_n=c_n$, the sum $a+b+c_0$ can be expressed using the bit values:

$$d_i (0 \leq i \leq (n-1)), \text{ and}$$

$$c_i (0 \leq i \leq n)$$

In the following description of some embodiments, $a+b+c_0$ will be denoted d, that is:

$$a+b+c_0=d$$

With:

$$d = (d_n; d_{n-1}; \ldots ; d_0)_2$$

The operand bit size n may be any positive integer. In some embodiments, n may be large (i.e. n»8). The arithmetic addition may be performed modulo a number N, for example $N=2^n$ in which case $c_{n+1}$ represents $2^n=0$, which hence can be dropped, leaving the result $a+b=d=(d_n, \ldots, d_0)_2 = (d_{n-1}, \ldots, d_0)_2$ on n-bits, which is compatible with other subsequent operations on the same date size n. The following description will be made with reference to a basic arithmetic addition without modulo operations, for illustrative purpose, although the skilled person will readily understand that the invention also applies to arithmetic additions modulo a number N, power of two (i.e., dropping the Most Significant Bits does not alter the result). Further, the skilled person will readily understand that the invention also applies to operations modulo a number which is non power of two.

In equation (2), MAJ denotes the majority function, defined as follows:

$$MAJ(a_i, b_i, c_i) = (a_i \wedge b_i) \vee (b_i \wedge c_i) \vee (c_i \wedge a_i) = (a_i \wedge b_i) \oplus (b_i \wedge c_i) \oplus (c_i \wedge a_i) \quad (3)$$

Operators are defined as follows:
"⊕" designates logical exclusive OR;
"∧" designates logical AND;
"∨" designates logical OR.

An addition between two binary operands a and b, may be implemented using a logical circuit comprising a set of elementary adders for performing bitwise additions between the bit components a, and b, of each operand a or b. The result of the arithmetic addition operation is then derived from the sum outputs provided by each elementary adder 10. A memory 3 may be used to store the intermediary results (sum outputs) of each elementary adder 10.

Embodiments of the invention provide an addition execution method and an adder device 100 for executing a cryptographic operation on data blocks, the execution of the cryptographic operation comprising the execution of at least one arithmetic addition operation between a first operand a and a second operand b. Each operand a or b may be an integer having a given bit size n and representing a data block. Each operand a or b comprising a set of components (total number of components is n), each component corresponding to a given bit position i of the operand.

Figure 2:
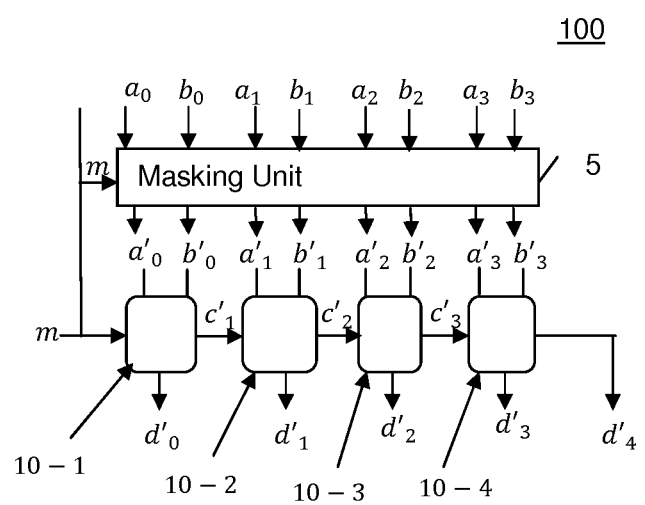
FIG. 2 depicts a masked n-bit adder device, according to some embodiments.

FIG. 2 depicts a masked n-bit adder device 100 according to some embodiments.

The adder device 100 comprises a set of elementary adders 10. In the example of FIG. 2, n=4 elementary adder sub-circuits 10 are shown. The (i+1)-th elementary adder, designated by reference 10-(i+1), is associated with a given bit position i of the operands. It is configured to perform a bitwise addition between a component $a'_i$, derived from the i-th component $a_i$ of the first operand at the bit position i, and the component $b'_i$ derived from the i-th corresponding component $b_i$ of the second operand at the same bit position i, using a carry $c'_i$ generated by the computation performed by the i-th elementary adder corresponding to the previous bit position i−1. Each (i+1-th elementary adder deliver a sum output $d'_i$ corresponding to the bitwise addition and a carry output $c'_{i+1}$, the result of the arithmetic addition operation being derived from the sum ouputs provided by each elementary adder 10.

In a conventional adder device, the (i+1)-th elementary adder performs directly a bitwise addition between the component $a_i$ of the first operand at the bit position i and the component $b_i$ of the second operand at the same bit position i, using a carry $c_i$ generated by the computation performed by the i-th elementary adder corresponding to the previous bit position i−1. Further, each conventional (i+1)-th elementary adder delivers a sum output $d_i$ corresponding to the bitwise addition and a carry output $c_{i+1}$, the result of the arithmetic addition operation being derived from the sum ouputs provided by each elementary adder 10.

According to embodiments of the invention, the adder device 100 may be configured to apply a mask m (which is a bit) to each operand component input $a_i$ or $b_i$ of at least some of the elementary adders 10 of at least some of the elementary adders 10 using at least one masking logical operation. The component $a'_i$ thus corresponds to the operand $a_i$ after masking with a mask m, and the component $b'_i$ corresponds to the operand $b_i$ after masking with a mask m. The same mask may be preferably applied to $a_i$ and $b_i$. Further, in the embodiment of FIG. 2, the same mask may be applied to all the elements for 0≤i<n. The mask may comprise some random Least Significant Bits (LSB), the other bits (i.e., the Most Significant Bits or MSB) remaining constant (for instance at zero). In some embodiments, it may be particularly advantageous to adapt the mask bit-width to the bit-width of the data to protect, which can be smaller than the register in which it is stored. For instance, considering that a byte can be stored in a 32-bit register, the mask may have its 8 LSB random, and its 24 MSB stuck at 0.

In some embodiments, a trans-masking module may be used. According to some embodiments of the invention, the adder 100 may comprise at least one masking unit 5 configured to apply a mask m to at least some of the inputs $a_i$, $b_i$, $c_i$ of each elementary adder sub-circuit 10 using at least one masking logical operation. For example, it may occur that sensitive data fit on a smaller bit-width than the bit-width of the register, in particular on some generic computing platform, configured to both handle sensitive and non-sensitive data.

The cryptographic engine 11 may be further configured to perform de-masking, the de-masking consisting in removing by a logical operation, such as XOR, the mask after the addition (with or without carry), so as to yield the correct addition value as if no mask has been used. Advantageously, when the input is masked, the arithmetic operations according to the invention have the property that the output is also masked. That is, several operations (arithmetic operations or other types of operations such as Boolean logic for example) may be carried out successively, whereby the manipulated data remains advantageously masked and thus protected against attacks. The skilled person will readily understand that the invention can also apply to compositions, be them sequential (one after the other) or parallel (same masked data feeding two independent operators processing). Accordingly, the invention can apply to complex operations, thereby extending addition to multiplication (e.g., bit-serial parallel implementation of multipliers) and/or to any arithmetic operations (powers, quotient and remainders, etc.).

Each mask m may be a random bit number. For improved masking, the bit distribution may be uniform (hence of maximal entropy). Each mask may be generated by a Random Number Generator (not shown), that may be provided by the same chip as the cryptosystem or via a separate chip such as a TPM (Trusted Platform Module), a HSM (Hardware Security Module) or a quantum source, whose function is to compute cryptographic-grade random numbers. The Random Number Generator may be provided with dedicated protection to secure the generated masks. Such secrecy of the masks guarantees the security of the masking scheme. Hence, protections such as sensors and shields may be deployed to ensure that masking bits remain confidential.

The mask value may be generated periodically, for example at each clock cycle, or at each addition computation.

In one embodiment, the same mask m may be applied to each masked input. In some embodiments, a mask may be applied to all the inputs $a_i$, $b_i$, and $c_0$ of at least some of the n elementary adders 10.

In a particular embodiment, a mask may be applied to all the inputs $a_i$, $b_i$, and $c_0$ of all n elementary adders 10.

In the embodiment of FIG. 2, for example, a same mask m is applied to all the inputs $a_i$, $b_i$, $c_i$ of all n elementary adder sub-circuits 10.

In one embodiment, the masking logical operation applied to each operand bit may be a XOR logical operation (also denoted by the operator "$\oplus$"). In some embodiments, it is possible to swap the roles of the Boolean operator XOR and of the arithmetic operator ADD: the masking is then additive while the operation to be protected is Boolean. Further, in some embodiments, the masking unit 5 may apply additional masking to the Boolean masking according to embodiment of the invention. In particular, in one embodiment, it may apply a combination of the Boolean masking and further arithmetic masking, as depicted by FIG. 3A.

Figure 3A:
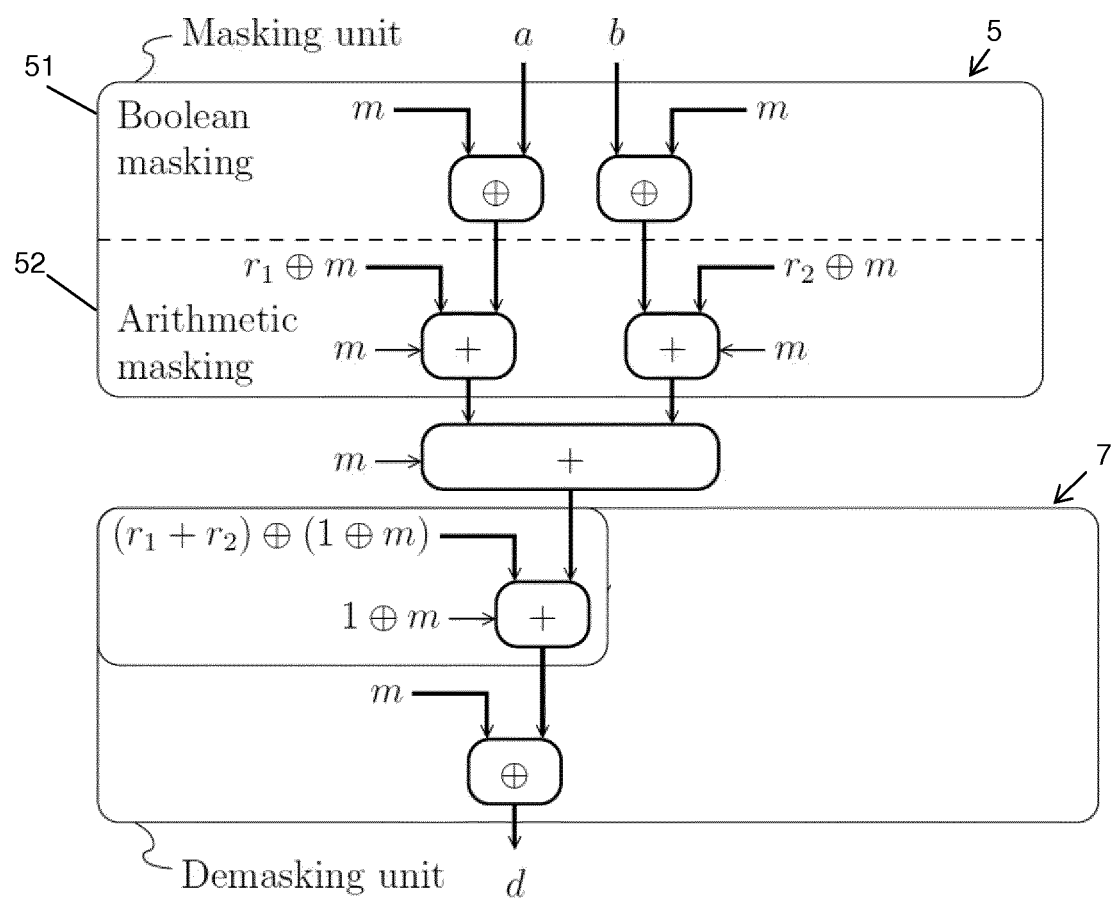
FIG. 3A shows a masking unit and a demasking unit, according to some embodiments.

FIG. 3A shows a masking unit 5, configured to apply a mask m to at least some of the inputs $a_i$, $b_i$, $c_i$ of each elementary adder sub-circuit 10 using at least one masking logical operation, and a demasking unit 7 configured to demask a masked bit vector, according to some embodiments. In FIG. 3A, the thin arrow represents bits (input carries), whereas thick arrows represent bit vectors. The symbol m, when it is the input of a thick arrow, represents the concatenation (m , . . . , m) of n times the bit value m.

In the embodiment of FIG. 3A, the masking unit 5 may comprise a Boolean masking unit 51 configured to apply a Boolean masking to two inputs a and b using a mask m and an arithmetic masking unit 52 configured to further apply an additional arithmetic masking to the outputs a'=a$\oplus$m and b'=b$\oplus$m using the mask m and a parameter $r_i \oplus m$ (i=1 for a" and i=2 for b". The arithmetic masking unit 52 thus delivers two outputs a 41 =a'+($r_1 \oplus m$) and b"=b'+($r_2 \oplus m$). The demasking unit 7 is configured to perform operations which are reversed with respect to the operations performed by the masking unit 5. In the embodiment of FIG. 3A, the demasking unit 7 is configured to subtract $r_1 + r_2$ to the input masked by m, and yield result masked by m, which provides an output d. This enables a protection of an operation a+b=d with a Boolean masking on top of the arithmetic masking.

Figure 3B:
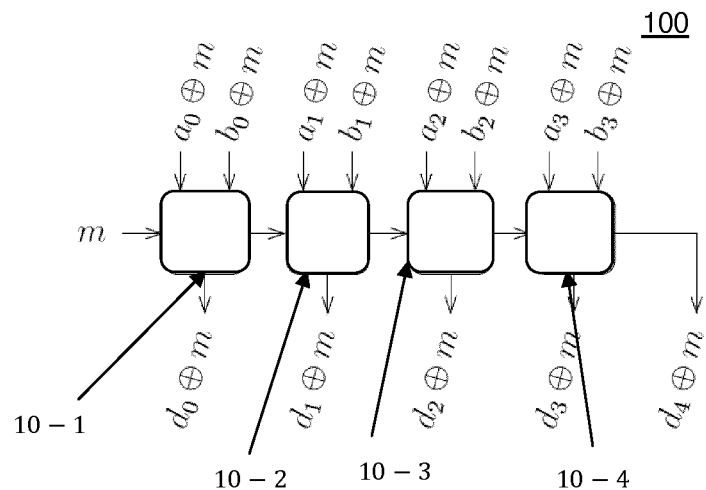
FIG. 3B represents a masked adder device, according to an embodiment.

FIG. 3B represents a masked adder device 100 according to an embodiment where the same mask m is applied to all operand bits and all elementary adders, using a masking logical operation of XOR type. In such embodiment, the XOR logical operation is performed between each operand component $a_i$ or $b_i$ and the mask m so that the inputs $a_i$ or $b_i$ of the (i+1)-th elementary adder 10 are replaced with $a_i \oplus m$ and $b_i \oplus m$ (each component $a_i$ and $b_i$ is respectively XORED with the mask m). The carry obtained for each stage i is then $c'_{i+1} = c_{i+1} \oplus m$ (with $c_0=0$), as a result of the properties of an XOR logical operator.

Indeed, the following properties are satisfied for all m in {0,1}:

$$d_i \oplus m = (a_i \oplus m) \oplus (b_i \oplus m) \oplus (c_i 61\ m) \quad (4)$$

$$c_{i+1} \oplus m = \mathrm{MAJ}(a_i \oplus m,\ b_i \oplus c_i \oplus m) \quad (5)$$

Where m denotes a mask.

Equations (4) and (5) can be rewritten as follows:

$$d'_i \oplus m = (a'_i \oplus b'c'_i) \quad (6)$$

$$c'_{i+1} \oplus m = \mathrm{MAJ}(a'_i,\ b'_i,\ c'_i) \quad (7)$$

where $a'_i = (a_i \oplus m)$, $b'_i = (b_i \oplus m)$, $c'_i = (c_i \oplus m)$, $c'_{i+1} = (c_{i+1} \oplus m)$, $d'_i = (d_i \oplus m)$, and where $a_i$, $b_i$, $c_i$, et $c_{i+1}$ are linked by relationships (1) and (2).

The carry delivered for the next stage i=0 to (n−1) is thus $c_{i+1} \oplus m$. Further, the sum output $d_i$ obtained from each stage i is $d'_i = d_i \oplus m$, as a result of the properties of an XOR logical operator (defined by equations (5) and (6)).

Accordingly, each (i+1)-th elementary adder sub-circuit 10, for i=0 to (n−1), is configured to perform the operation described by equation (1) and (2) and receives as inputs $a_i \oplus m$, $b_i \oplus m$, $c_i \oplus m$ and provides as outputs $c_{i+1} \oplus m$ and $d_i \oplus m$. For i=0, the first elementary adder sub-circuit 10 receives as inputs $a_0 \oplus m$, $b_0 \oplus m$, and carry $c_0 \oplus m$ with $c_0=0$.

FIG. 3B shows that the addition of a and b is transparent to masking with one mask: the result of the addition of a and b is unchanged by applying a mask to each bit of the operands a, b (XORING each input a, b with m).

Such transparency advantage stems from the properties (4) and (5).

Equation (4) is derived from equation (1) and is due to the associativity of the XOR operator.

The property defined by equation (5) is inherent to the majority function MAJ. Its dual function is also the majority. The majority MAJ of ones (at least two ones amongst three bits) is the opposite of the majority of zeroes (at least two zeroes amongst three bits). This can be written:

$$\mathrm{MAJ}(\neg a_i, \neg b_i, \neg c_i) = \neg \mathrm{MAJ}(a_i, b_i, c_i) \quad (8)$$

As used herein, the operator also called '¬', also called 'neg', returns the value in negative that is: ¬0=1 and ¬1=0.

Equation (5) can be rewritten:

$$\forall m \in \{0,1\},\ c_{i+1} \oplus m = \mathrm{MAJ}(a_i \oplus m,\ b_i \oplus m,\ c_i \oplus m) = \mathrm{MAJ}(a_i, b_i, c_i) \oplus m \quad (9)$$

Equation (7) shows that addition is transparent to masking with a mask m, provided that the carries are also inverted (not only the inputs a and b are inverted, but also the input carry).

In some embodiments, each elementary adder sub-circuit 10 may be implemented as a Full adder.

Figure 4:
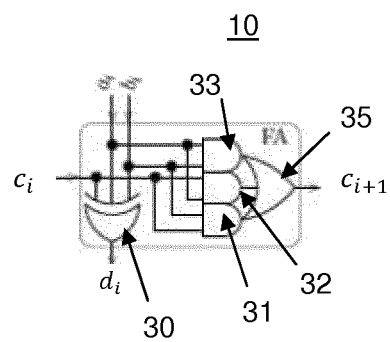
FIG. 4 represents a Full Adder, according to some embodiments.

FIG. 4 represents a (i+1)-th Full Adder 10 used as a one-bit slice of the masked adder 100 for adding the i-th components of the two binary operands a and b, the masked adder 100 being configured to determine the result of the addition between a and b, according to some embodiments in a protected way. Each full adder (FA) 10 adds binary numbers and accounts for values carried in as well as out. The one-bit full adder 10 adds the three one-bit numbers $a_i \oplus m$, $b_i \oplus m$, $c_i \oplus m$, $c_i \oplus m$ being the bit carried ("carry") in from the previous FA stage (i-th full adder which is not shown in FIG. 3B). The circuit produces a two-bit output comprising an output carry $c_{i+1} \oplus m$ and a sum output $d_i \oplus m$. A full adder can be implemented using a transistor level circuit or other gates. The full adder 10 depicted in FIG. 3B comprises:

an XOR logical gate 30 receiving as inputs $c_i \oplus m$, $a_i \oplus m$, and $b_i \oplus m$;

Three AND logical gates 31, 32, and 33, the first AND gates 31 receiving as inputs $a_i \oplus m$ and $b_i \oplus m$, the second AND gates 32 receiving as inputs $a_i \oplus m$ and $c_i \oplus m$, the third AND gates 33 receiving as inputs $b_i \oplus m$ and $c_i \oplus m$;

An OR logical gate 35 receiving as inputs three outputs of the AND gates 31, 32 and 33.

In some embodiments, different masks may be applied to a sequence or a set of elementary adders 10, each comprising one or more elementary adders. An elementary adder will be referred to hereinafter using an index i, with $0 \leq i \leq n-1$. The number of elementary adders using a mask $m_k$ will be denoted $N_k$, hereinafter. Accordingly, a given mask $m_k$ may be applied to a sequence of elementary adder sub-circuits 10 while one or more different masks $m_{k+1}, \ldots, m_{L-1}$ may be applied to other sequences of elementary adder sub-circuits 10 of the adder device 100. Each mask $m_0, m_k, \ldots, m_{L-1}$ may be determined randomly in some embodiments. The index k may range from k=0 to L−1. The index L may range from L=1 (only one masking bit) to L=n (i.e. the masking bit is changed between each elementary adder 10). The different masks may be random and independent binary values. In one embodiment, each value $m_{k+1}$ may corresponds to an update of the mask $m_k$, each update being generated periodically, the new value being applied to the current elementary adders 10 as long as no new mask value has been received. In some embodiments, the masks $m_k$ may be applied to a set of elementary adders comprising a same number of adders or to set of elementary adders comprising different numbers of adders.

In one embodiment, the sum of the numbers $N_k$ for k=1 to L−1 is equal to the number n of elementary adder sub-circuits 10:

$$\Sigma_{k=0}^{L-1} N_k = n \tag{10}$$

Advantageously, the number of adders with the same mask (i.e., the number $N_k$) may be a power of two, for instance to match a machine word length (e.g., 8, 16, 32, or 64 bits).

Figure 5:
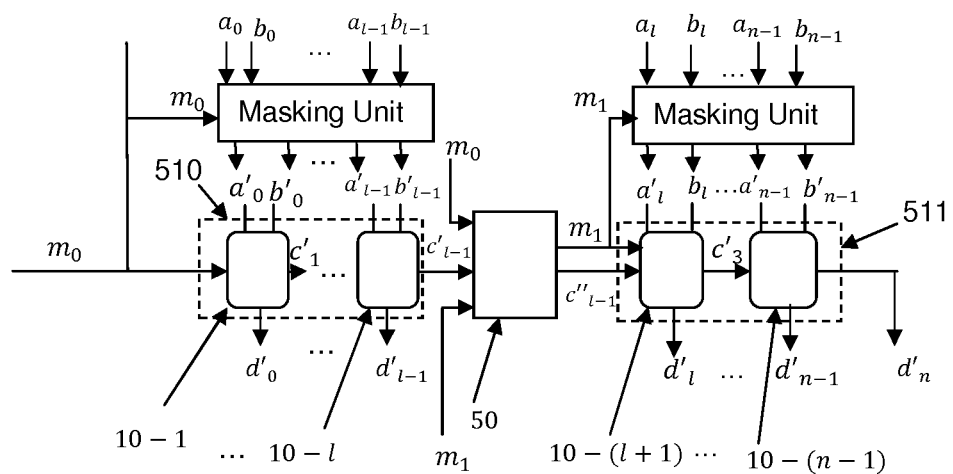
FIG. 5 represents a masked adder device in which different masks are applied, according to such embodiments.

FIG. 5 represents a masked adder device 100 in which different masks are applied, according to such embodiments.

A mask $m_{k+1}$ may be applied to a current sequence 511 of elementary adders 10 using a switching sub-circuit 50 between the current sequence of elementary adders 10 and the previous sequence 510 of elementary adders 10 masked with mask $m_k$. The switching sub-circuit 50 (also referred to as a "transmasking" sub-circuit) may be configured to switch the masks from mask $m_k$ to mask $m_{k+1}$, and apply the new mask $m_{k+1}$ to the current sequence 511, while delivering the carry $c''_{l-1} = c'_{l-1} \oplus m_k = \text{MAJ}(a_{l-2}, b_{l-2}, c_{l-2}) \oplus m_k$ to the current sequence 510 of elementary adders 10.

A mask $m_{k+1}$ applied to a next sequence of elementary adder sub-circuits 10 may be predetermined randomly, for example by a random number generator. The switching sub-circuit 50 may thus be inserted between:
- the last elementary adder sub-circuit 10-l (l-th elementary adder sub-circuit) of the previous sequence 510 of elementary adder sub-circuits 10; and
- the first elementary adders 10-(l+1) ((l+1)-th elementary adder sub-circuit) of the current sequence 511 of elementary adder sub-circuits 10.

The switching sub-circuit 50 may be configured to switch the mask value from previous mask $m_k$ to new mask $m_{k+1}$ by performing logical operations. More specifically, the switching sub-circuit 50 may:
- receive as inputs the value of the mask $m_k$ applied to the previous sequence 510 of elementary adder sub-circuits 10 and the output $c'_l = c_l \oplus m_k$ of the last elementary adder sub-circuit (l-th elementary adder sub-circuit) of the previous sequence 510 of elementary adder sub-circuits 10. This further comprises receiving a fresh mask $m_{k+1}$;
- deliver as output the output $c'_l = c_l \oplus m_k$ of the last elementary adder sub-circuit of the previous sequence 510, the value $c_l \oplus m_{k+1}$ being inputted to the first elementary adder sub-circuit ((l+1)-th elementary adder sub-circuit) of the current sequence 511 of elementary adder sub-circuits 10.

Figure 6:
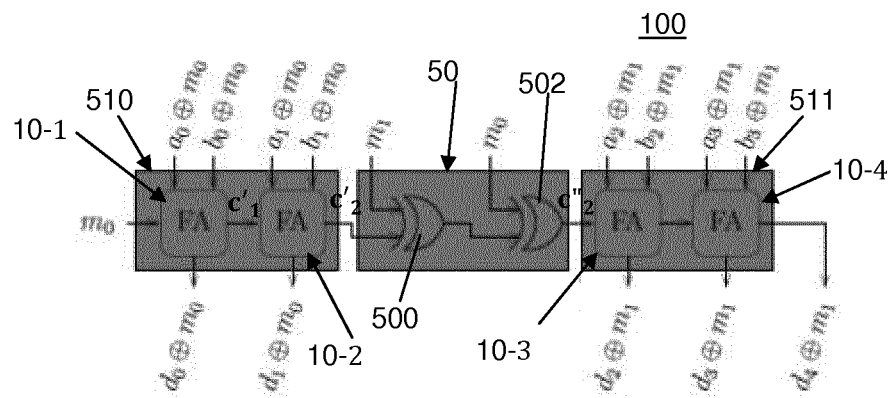
FIG. 6 shows a masked n-bit adder for adding a first binary operand and a second binary operand, according to one embodiment.

FIG. 6 shows a masked n-bit adder for adding a first binary operand a and a second binary operand b, for n=4 (a and b being n-bits integers) using two different masks $m_0$ and $m_1$ applied to two different sequences of elementary adders 10, according to one embodiment. In the example of FIG. 6, each elementary adder is of Full Adder type.

As shown in FIG. 6, the adder circuit comprises 4 full adders 10-i, each full adder performing the i-th bitwise operation according to equations (1) and (2), with i=0 to 3.

The first mask $m_0$ is applied to a sequence 401 of full adders comprising the first two full adders 10-1 and 10-2. The second mask $m_1$ is applied to a sequence 402 of full adders, comprising the last two full adders 10-3 and 10-4.

The mask $m_0$ is initially applied to the first stage (first elementary adder 10-1) for the first bit i=0.

The first Full Adder 10-1 receives as inputs $a_0 \oplus m_0$, $b_0 \oplus m_0$, $m_0$ and provides as output $d_0 \oplus m_0$ and $c'_1 = c_1 \oplus m_0$ with:

$$d_0 \oplus m_0 = (a_0 \oplus m_0) \oplus (b_0 \oplus m_0) \oplus (c_0 \oplus m_0) \tag{11}$$

with:

$$c'_1 = \text{MAJ}(a_0, b_0, c_0) \oplus m_0 \tag{12}$$

Similarly, the second Full adder 10-2 receives as inputs $a_1 \oplus m_0$, $b_1 \oplus m_0$, $c_1 \oplus m_0$ and provides as output $d_1 \oplus m_0$ and $c'_2 = c_2 \oplus m_0$ with:

$$d_1 \oplus m_0 = (a_1 \oplus m_0) \oplus (b_1 \oplus m_0) \oplus (c_1 \oplus m_0) \tag{13}$$

with:

$$c'_2 = \text{MAJ}(a_1, b_1, c_1) \oplus m_0 \tag{14}$$

In the embodiment of FIG. 6, a switching sub-circuit 50 is arranged between the second stage and the third stage. The input of the switching sub-circuit 50 is the carry $c'_2$ of the second Full adder 10-2 and the output $c''_2 = c_2 \oplus m_1$ of the switching sub-circuit 50 is delivered to the third Full adder 10-3.

The switching sub-circuit 32 may comprise two XOR logical gates 620 and 621. The first XOR gate 500 receives as input the mask $m_1$ and the carry $c'_2$ of the second Full adder 10-2 with $c'_2 = c_2 \oplus m_0 = \text{MAJ}(a_1, b_1, c_1) \oplus m_0$. The first XOR gates thus performs the operation:

$$S' = m_1 \oplus c'_2 = m_1 \oplus c_2 \oplus m_0 \tag{15}$$

The second XOR gates 502 receives as input the mask $m_0$ and the output S' of the first XOR gates 502. The second XOR gates 502 accordingly performs the operation:

$$S'' = m_0 \oplus S' = m_0 \oplus (m_1 \oplus c'_2) = m_0 \oplus m_1 \oplus c_2 \oplus m_0 \tag{16}$$

S" is thus equal to $c''_2 = c_2 \oplus m_1$

It should be noted that, in order to prevent $c_2$ from appearing transiently unmasked, gates 500 and 502 should not be swapped.

$b_2$ and $c_2$ being masked by the same mask $m_1$, equation (5) applies.

The output S" of the switching circuit 50 may be applied to the third full adder corresponding to the third bit (i=2).

The third Full Adder 10-2 receives as inputs $a_2 \oplus m_1$, $b_2 \oplus m_1$, $c_2 \oplus m_1$ and provides as output $d_2 \oplus m_1$ and $c''_3 = c_3 \oplus m_1$ with:

$$d_2 \oplus m_1 = (a_2 \oplus m_1) \oplus (b_2 \oplus m_1) \oplus (c_2 \oplus m_1) \tag{17}$$

with:

$$c''_2 = MAJ(a_2, b_2, c_2) \oplus m_1 \quad (18)$$

Similarly, the fourth Full adder 30-4 (i=3) receives as inputs $a_4 \oplus m_1$, $b_4 \oplus m_1$, $c_4 \oplus m_1$ and provides as output $d_4 \oplus m_1$ with:

$$d_4 \oplus m_1 = (a_4 \oplus m_1) \oplus (b_4 \oplus m_1) \oplus (c_4 \oplus m_1) \quad (19)$$

It should be noted that the number of different masks applied the full adders 10 of the n-bit adder 100 may vary depending on the application. One to n different masks may be applied, each k-th mask $m_k$ being implementable using a switching circuit 50 comprising logical gates arranged to switch the mask value from the mask $m_k$ to the mask $m_{k+1}$. The number of different masks applied to the adder 100 allows adjusting the overall entropy of the masking, depending on the requirements of the application of the invention.

The invention is not limited to the application of a mask $m_k$ to the inputs of the elementary adders 10 using a two-input XOR operator. Such XOR operator may have more than two inputs. Alternatively, it may be replaced with a mixture between Boolean XOR and arithmetic additions, as in the case of the hybrid Boolean and arithmetic masking scheme depicted in FIG. 3A.

It should be noted that the invention is not limited to the use of switching circuit 50, as depicted in FIG. 6, to generate the mask of the next sequence. In other embodiments, different types of switching circuits may be used.

While the invention has been described in relation with a cryptographic operation of the type addition between two binary operands, the invention more generally applies to any cryptographic operation, the execution of which involving at least on addition between two binary operands, the computation of each addition being performed using the adder 100. The cryptographic operation may be for example a multiplication, a subtraction or a division, such operation being implemented using several add steps. For example, a binary multiplication operation PQ can be implemented as a sequence of Q elementary additions P+ . . . +P. In such embodiment, each elementary addition may be performed using the n-bit adder 100.

Further, the invention is not limited to the use of elementary adders 10 of the type full adder for performing each bitwise addition operation. Further, the invention is not limited to the logic design of FIG. 3B and may comprise additional blocks to reduce the propagation delay of the adder 100. The adder device 200 may be implemented according to different adder designs such as a "carry look ahead" adder, or "carry propagate" adder, or "generate" adder design.

For example, the adder device 100 may be of the type "carry look-ahead adder". The "carry look-ahead adder" implementation is based on the calculation of the carry signals in advance, based on the input signals. Such implementation is based on the fact that a carry signal will be generated in two cases for the addition of two bits $A_i$ and $B_i$:

when both bits $A_i$ and $B_i$ are equal to 1, or when one of the two bits is equal to 1 while the carry-in (carry of the previous stage) is 1.

Figure 7:
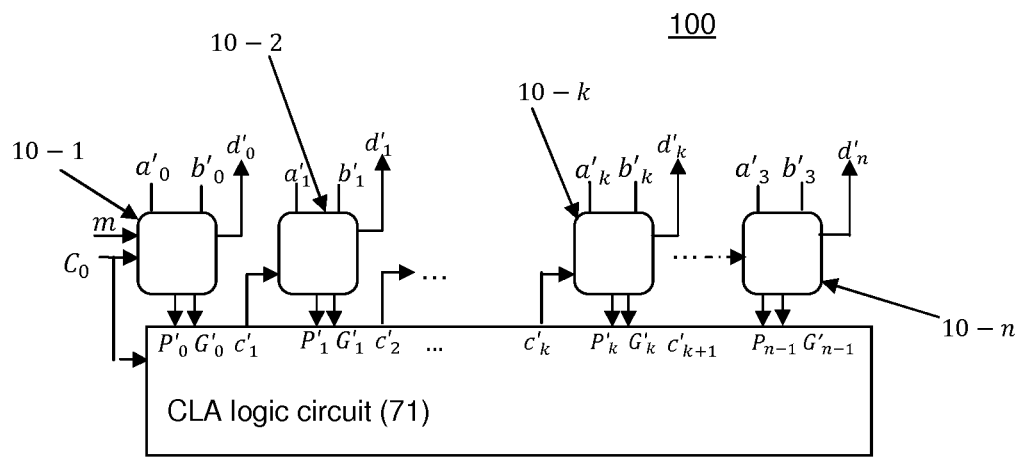
FIG. 7 represents a masked n-bit adder of carry look-ahead adder (CLA adder) type, according to an embodiment.

FIG. 7 represents a masked n-bit adder 100 of carry look-ahead adder (CLA adder) type, according to an embodiment. In such embodiment, a Carry Look Ahead block 71 is added.

A CLA block exploits the signals $P'_i$, and $G'_i$ which are defined such that:

$$P'_i = a'_i \oplus b'_i \quad (20)$$

$$G'_i = a'_i b'_i \quad (21)$$

The output sum and carry can thus be defined as:

$$G'_i = P'_i \oplus c'_i \quad (22)$$

$$c'_{i+1} = G'_i + P'_i c'_i \quad (23)$$

A carry $c'_{i+1}$ is generated whenever $G'_i = 1$, regardless of the input carry $c'_i$ ($G'_i$ is referred to as "carry Generate" signal).

The input carry is propagated to the output carry ($c'_{i+1} = c'_i$), whenever $P'_i = 1$. The signal $P'_i$ is thus referred to as the carry propagate signal.

The determination of the values $P'_i$ and $G'_i$ only depends on the input operand bits $a'_i$ and $b'_i$. Accordingly, the $P'_i$ and $G'_i$ reach a steady-state value after the propagation through their associated gates.

The masked-CLA adder 100 can be implemented using three levels:

A First level comprising the n elementary adders 10 of Full Adder type, each generating $P'_i$ and $G'_i$ signals, comprising an XOR gate and an AND gate for each couple $\{P'_i, G'_i\}$ signals. Output signals of $P'_i$ and $G'_i$ may be valid after 1T. The i-th carry output $c'_i$ may depend on the signals $P'_i$ and $G'_i$, for i=1 to n-1, and on $c'_0$. Each carry signal thus depends directly on $c'_0$ rather than its preceding carry signal. Each output carry may be implemented in a two-level circuit having a propagation delay of two gates (2T), with T designating the propagation delay;

A Second level formed by the Carry Look-Ahead (CLA) logic block 71 which consists of n two-level implementation logic circuits. The Carry Look-Ahead (CLA) logic block 71 generates the carry signals $c'_{i+1}$. Output signals $c'_{i+1}$ of this level may be valid after 3 T;

A third level using n XOR gates which generate the sum signals $d'_i$ from $P'_i$ and $G'_i$ ($d'_i = P'_i \oplus c'_i$) and the next carry $c'_{i+1} = G'_i + P'_i C'_i$. Output signals $d'_i$ of this level may be valid after 4T.

A mask $m_k$ is applied to each input component bit $a_i$, $b_i$ of the CLA adder (with i=0 to n-1), similarly to the embodiments described with reference to the previous figures. The mask may be the same for a set of full adders or for all full adders.

It is an advantage of the invention to be implementable with minor changes at the Hardware Description Language level (such as VHDL level).

In some applications of the invention related to the use of particular algorithms, the device 100 may be used to reduce a number a modulo another number b.

Figure 8A:
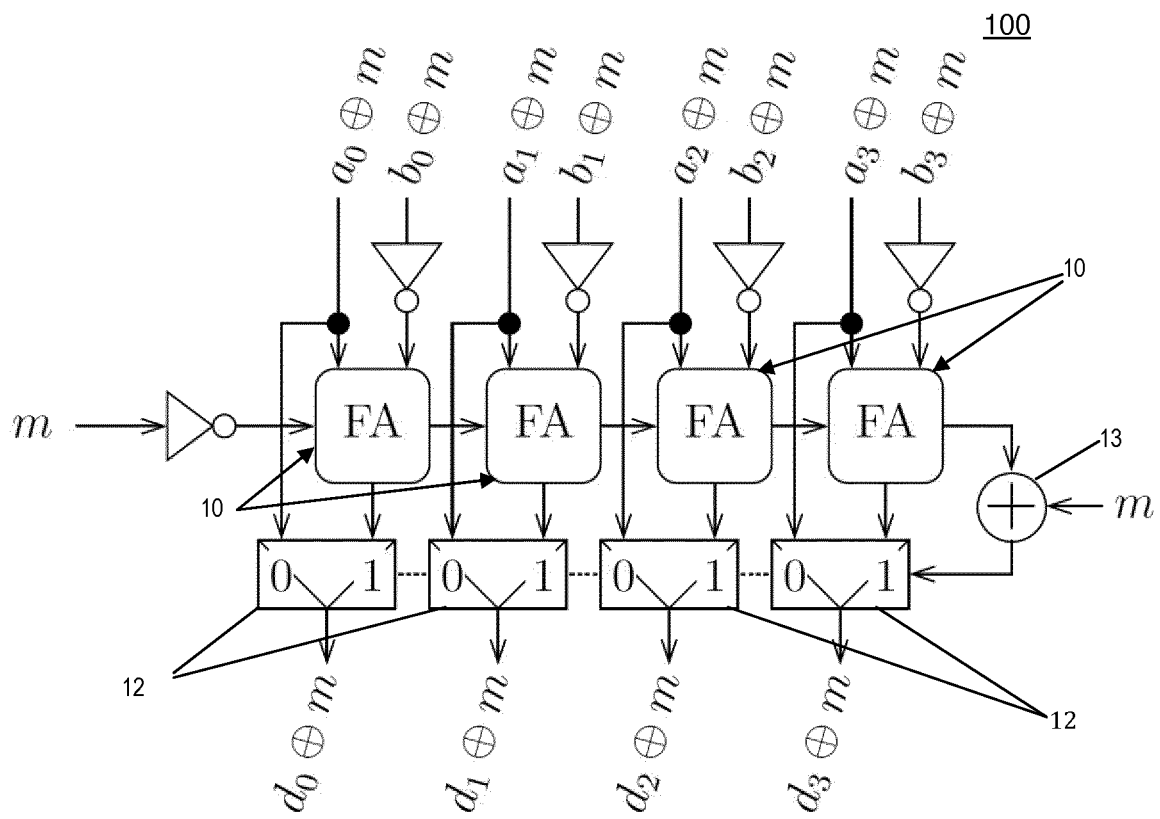
FIG. 8A represents a reduction device, according to an exemplary embodiment.

FIG. 8A represents a reduction device 100 configured to perform a masked n-bit reduction of a modulo b, with one mask m, according to an exemplary embodiment. In the example of FIG. 8A, four Full Adders 10 are used (n=4). Block 12 may be a multiplexer configured to choose either masked input a or the result of the masked addition between a and complemented version of b (plus complements carry), that is the masked result of a−b modulo $2^n$ (two to the power of n). Block 13 may be a demasking gate configured to determine whether a shall be reduced by subtracting b or whether a is already smaller than b. The Invertors may be used to take the complement value of b, since a−b is also a+¬b+1.

It is assumed in the following description of some embodiments that $a=(a_{n-1}, \ldots, a_0)_2$ and $b=(b_{n-1}, \ldots, b_0)_2$ fit on n bits. The result of the reduction will be denoted by $d=(d_{n-1}, \ldots, d_0)_2$, which is such that d=a mod b. The case where the MSB $b_{n-1}$ of b is set to 1 is further considered. Accordingly:

$$d = a \bmod b = \begin{cases} a-b & \text{if } a \geq b, \text{ or} \\ a & \text{otherwise} \end{cases} \quad (24)$$

If b does not have its Most Significant Bit set, then the reduction may require more than one subtraction of m.

Another case where a maximum of one subtraction is required is after the addition (even with carry $c_0=1$) of two numbers already reduced, $0 \leq a$ and $a' \leq b-1$. Then:

$$0 \leq a+a'+1 \leq 2b-1 \quad (25)$$

Thus, after one subtraction of b (i.e., if $a+a'+1 \geq b$), inequality (25) becomes $0 \leq a+a'+1-b \leq b-1$, which is reduced.

The reduction operation (25) can be carried out on masked data. The test $a \geq b$ can be achieved thanks to the adder depicted in FIG. 2. Indeed, a b is equivalent to $a-b \geq 0$. It should be noted that:

$$b + \neg b = 2^n - 1 \quad (26)$$

hence:

$$a + \neg b + 1 = 2^n + (a-b) \quad (27)$$

Therefore, $a \geq b$ if and only if there is a carry while adding a and $\neg b$ with an input carry set to one.

It should be noted that unlike conventional approaches, the embodiments of the invention are homomorphic with a unique path. Accordingly, this obviates the need from accompanying the adder 100 by some logic which would compute a "correcting logic" on the mask m in parallel. The mask m is thus sufficient to protect the chained Boolean and arithmetic operations from end to end.

The invention may have a significant impact to improve the resistance of cryptosystems to non-invasive attacks when implemented in an embedded system such as mobile devices, smartcards or when implemented in a M2M platform and/or terminal in IoT architecture (Internet of Things).

Figure 8B:
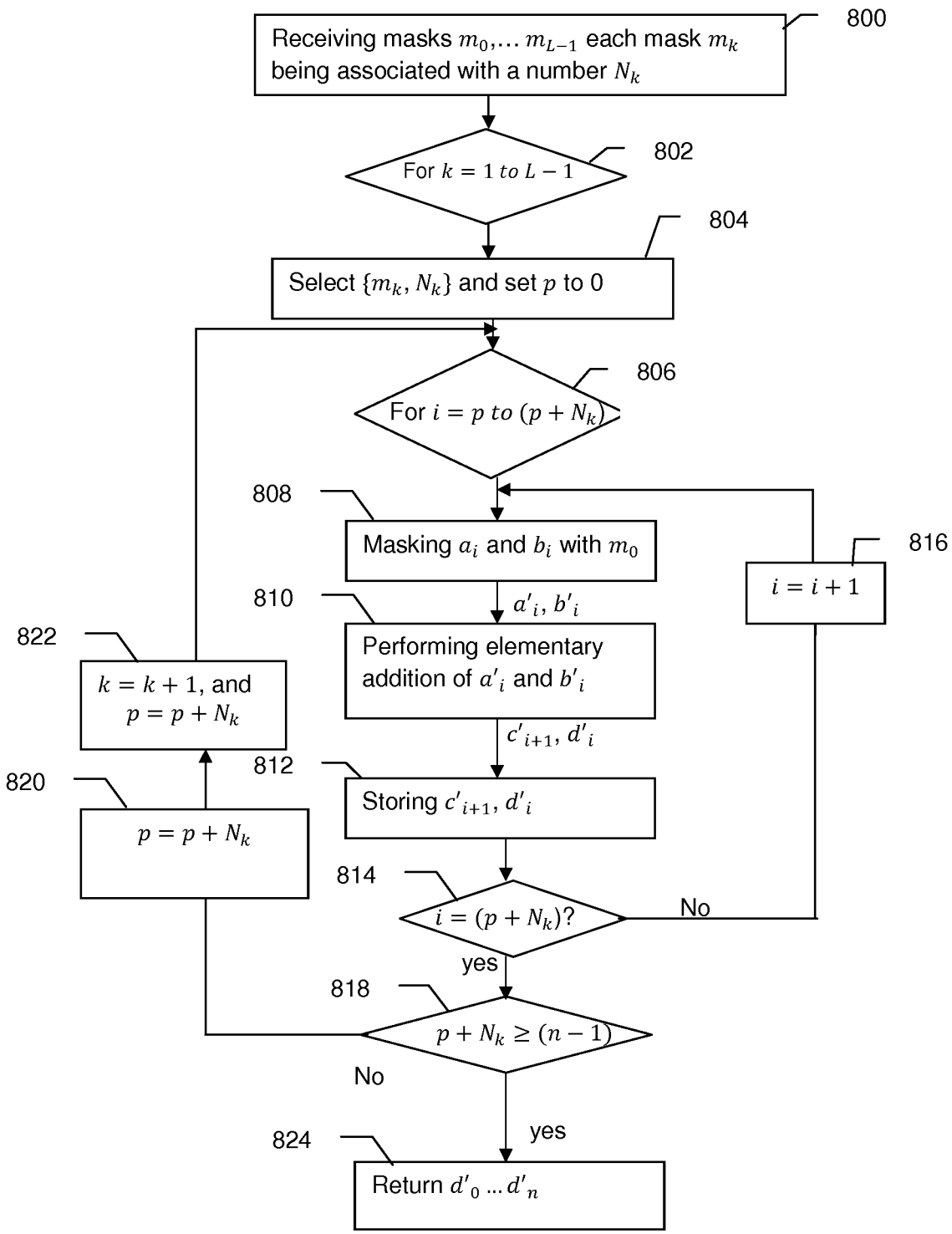
FIG. 8B is a flowchart depicting an adding method protected with masking for adding two binary operands, according to some embodiments of the invention.

FIG. 8B is a flowchart depicting an adding method protected with masking for adding two binary operands a and b, each having a n-bit size, according to some embodiments of the invention. The binary operand a comprises n bit components $a_i$ and the binary operand b comprises n bit components $b_i$.

The method may mask the addition with one or more masks $m_0, \ldots, m_{L-1}$, the masks being random and independent values. The masks may be generated periodically, as often as possible, at each execution of the method or at each clock cycle. The following description of the adding method will be made with reference to a masking based on a set of masks $m_0, \ldots, m_{L-1}$.

At step 800, a set of masks $m_0, \ldots, m_L$ is received, the masks $m_k$ being randomly generated. The set of masks comprise at least one mask. Each mask $m_k$ is associated with a number $N_k$ representing the number of bit components to which the mask is to be applied.

The following steps are iterated for k=1 to L with k#L (block 802).

At step 804, the mask $m_k$ is selected and an index p is set to 0. This mask will be applied to mask a first set of operand components $a_i$, $b_i$ for the bit positions of the operands comprised between i=p to i=p+$N_k$. The mask $m_k$ is thus iteratively applied to each bit component $a_p$ to $a_{p+N_k}$ and $b_p$ to $b_{p+N_k}$. More specifically, for each index i=p to i=p+$N_k$ (block 806):

At step 808, the bit components $a_i$ and $b_i$ of each operand a and b are masked with mask $m_k$, which provides masked bit components $a'_i$ and $b'_i$;

At step 810, the masked bit components $a'_i$ and $b'_i$ are added, which provides a sum output $d'_i = d_i \oplus m_k$, and a carry $c^{i+1} = c_i \oplus m_k$, according to equations (1) and (2);

At step 812, the output sum $d'_i$ and the carry $c'_{i+1}$ are stored.

At step 814, it is determined if index i has reached the value p+$N_k$. If not, i is incremented and steps 808 to 814 are iterated for the new value of i. Otherwise, if index i has reached the value p+$N_k$ (i=p+$N_k$), and if p+$N_k$<n-1 (block 818), p is set to p+$N_k$+1 at step 820, and at step 822, k is set to (k+1): the value of the mask $m_k$ is then switched to $m_{k+1}$ and $N_k$ is set to $N_{k+1}$. Further, at step 822, the stored value of $c'_{i+1}$ is replaced by:

$$c''_{i+1} = c_i \oplus m_{k+1}$$

Step 822 may comprise applying the following operation on $c'_{i+1}$ to derive $c''_{i+1}$:

$$c''_{i+1} = c'_i \oplus m_{k+1} \oplus m_k \quad (28)$$

Steps 806 to 814 are then iterated for the new values of p, $m_k$, and $N_k$.

If it is determined in block 818 that i=p+$N_k \geq$n-1, no new iteration is performed and step 824 returns $d'_0 \ldots d'_n$.

Although the adding method has been described, for simplification purpose only, according to an embodiment where the masks are all received initially in a first step 800, the skilled person will readily understand that, alternatively, the switching of the masks may be performed dynamically, the current mask $m_k$ being switch dynamically to a new mask value in response to the reception of a new mask value $m_{k+1}$, the new mask value being applied for each (i-th) iteration to add the binary components $a'_i$ and $b'_i$ until a new mask value $m_{k+2}$ is received. The mask value $m_{k+1}$ may be reused $N_{k+1}$ times, the value $N_{k+1}$ representing the time needed to obtain a new mask $m_{k+1}$. The new mask $m_{k+2}$ may be advantageously independent from the previous mask. In such embodiments, the numbers $N_k$ are not predefined and correspond to the number of iterations of steps 808-814 performed until the new mask value $m_{k+2}$ is received. The iterations can be done serially or in parallel.

Exhibit 1, that is included per se in the present specification, provides an exemplary application of the masking method according to the invention to protect the TEA algorithm (TEA stands for Tiny Encryption Algorithm). Annotations have been added in the code which are delimited using "/*" and "*/". The application of the masking method according to the embodiments of the invention thus allows to protect the algorithm against attacks.

The methods described herein can be implemented by computer program instructions supplied to the processor of any type of computer, to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

More generally, the adder device and adding method described herein may be implemented by various means in hardware, software, or a combination thereof.

Embodiments of the invention provide efficient protection for cryptographic algorithm using at least one addition operation secured against non-invasive attacks, whether the cryptographic algorithm is based on Boolean and/or arithmetic operations.

Although not limited to such embodiments, the invention is particularly adapted to large number libraries, where large integers are represented as a series of limbs, each limb being a machine word. For example, on a 32-bit machine, a 128-bit number a can be represented as $a=\Sigma_{i=0}^{15} a_i 2^{32i}$, where each $0 \leq a_i < 2^{32}$ is a limb.

Figure 9:
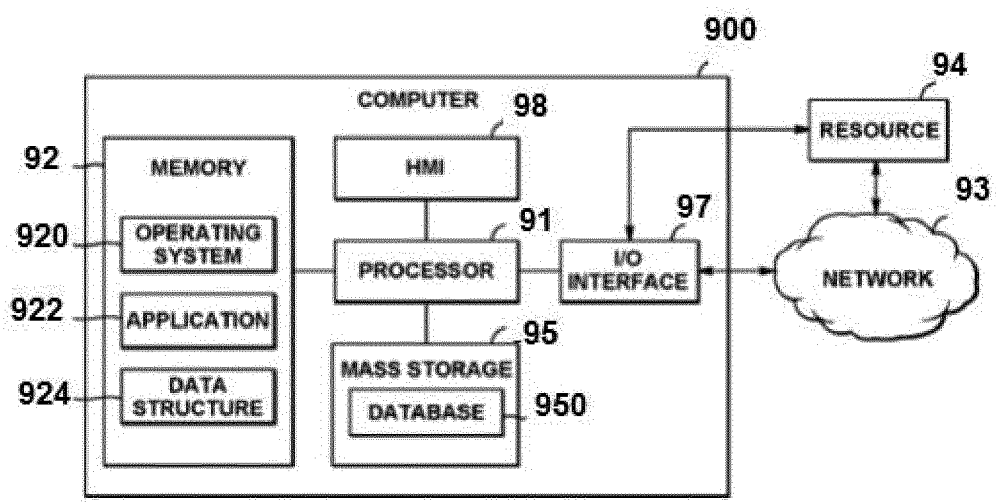
FIG. 9 depicts an exemplary implementation of the adder device, according to some embodiments.

FIG. 9 depicts an exemplary implementation of the adder device. The adder device 100 may be implemented on one or more computing devices or systems, referred to collectively as a computer such as computer 900. The computer 900 may include a processor 91, a memory 92, a mass storage memory device 95 (which may include one or more databases 950), an input/output (I/O) interface 97, and a Human Machine Interface (HMI) 98. The computer 900 may also be linked/connected to one or more devices, such as a random number generator generating masks, operatively coupled to one or more external resources via the network 93 and/or I/O interface 97. External resources 94 may include, but are not limited to, servers, databases, mass storage devices, peripheral devices, cloud-based network services, or any other suitable computing resource that may be used by the computer 900.

The processor 91 may include one or more devices that manipulate signals (analog or digital) based on operational instructions that are stored in the memory 92, such as microprocessors, micro-controllers, digital signal processors, microcomputers, central processing units, etc. Memory 92 may include a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. Processor 91 may execute instructions directly or under the control of an operating system 920 that resides in memory 92. The operating system 920 may manage computing resources so that computer program code embodied as one or more computer software applications, such as an application 94 residing in memory 92, may have instructions executed by the processor 91. One or more data structures 924 may also reside in memory 92, and may be used by the processor 91, operating system 920, and/or application 924 to store or manipulate data. The data structures 924 may include data structures for securely storing the masks. Such secure storage may be a shared structure mutualized to protect also the cryptographic secret parameters.

The I/O interface 97 may provide a machine interface that operatively couples the processor 91 to other devices and systems, such as the network 93 and/or external resource 84. The HMI 98 may be operatively coupled to the processor 91 of computer 900 in a known manner to allow a user of the computer 900 to interact directly with the computer 900. The HMI 98 may include any suitable audio and visual indicators capable of providing information to the user (video and/or alphanumeric displays, a touch screen, a speaker, etc.) and input devices and controls capable of accepting commands or input from the user and transmitting the entered input to the processor 90.

While certain embodiments of the invention have been described mainly in relation to the execution of an arithmetic addition operation used for encryption/decryption of data, it should be noted that the invention it not limited to such application. For example, the invention may also be used in data signature applications for ensuring the authenticity of a digital document or message (for example in the field of files and software distributions, or for financial transactions).

The invention may be applied to any type of cryptographic system executing at least one arithmetic addition as used in embedded systems such as smart cards, embedded secure devices, multimedia players, recorders, or mobile storage devices like memory cards and hard discs, the access to the embedded systems being monitored by the cryptosystem. The addition execution methods and devices may further be used in a wide range of communication and data processing applications such as in the car industry to ensure anti-theft protection, in service provider systems to secure access cards, in RFID™ tags and electronic keys, in mobile phone devices to authenticate the control and access to resources such as batteries and accessories, in manufacturing of embedded devices and equipments to provide a protection of hardware and software algorithms against cloning and reverse engineering, in banking industry to secure banking accounts and financial transactions, etc.

In general, the routines executed to implement the embodiments of the invention, implemented as part of an operating system and/or a specific application, component, program, object, module or sequence of instructions, or even a subset thereof, may be referred to herein as "computer program code", or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While all of the disclosure has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described.

Exhibit 1

Exemplary code to applying the masking method to a TEA algorithm:

```
#include <stdint.h>
void encrypt (uint32_t* v, uint32_t* k) {
        uint32_t v0=v[0], v1=v[1], sum=0, i;                    /* set up */
        uint32_t delta=0x9e3779b9;                              /* a key schedule constant */
        uint32_t k0=k[0], k1=k[1], k2=k[2], k3=k[3]; /* cache key */
    for (i=0; i < 32; i++) {                                    /* basic cycle start */
        sum += delta;
        v0 += ((v1<<4) + k0) ^ (v1 + sum) ^ ((v1>>5) + k1);
        v1 += ((v0<<4) + k2) ^ (v0 + sum) ^ ((v0>>5) + k3);
        }                                                       /* end cycle */
        v[0] =v0; v[1] =v1;
}
void decrypt (uint32_t* v, uint32_t* k) {
        uint32_t v0=v[0], v1=v[1], sum=0xC6EF3720, i; /* set up */
        uint32_t delta=0x9e3779b9;                              /* a key schedule constant */
        uint32_t k0=k[0], k1=k[1], k2=k[2], k3=k[3]; /* cache key */
        for (i=0; i<32; i++) {                                  /* basic cycle start */
            v1 -= ((v0<<4) + k2) ^ (v0 + sum) ^ ((v0>>5) + k3);
            v0 -= ((v1<<4) + k0) ^ (v1 + sum) ^ ((v1>>5) + k1);
            sum -= delta;
        }                                                       /* end cycle */
        v[0] =v0; v[1] =v1;
}
```

The invention claimed is:

1. A cryptographic system comprising a device for executing a cryptographic operation on bit vectors, the execution of said cryptographic operation comprising the execution of at least one arithmetic addition operation between a first operand and a second operand, each operand being an integer of a given bit size and representing a bit vector, each operand comprising a set of components, each component corresponding to a given bit position of the operand, the device comprising a set of elementary adders, each elementary adder being associated with a given bit position of the operands, wherein each elementary adder other than the elementary adder in a least significant bit position has a sum output corresponding to a bitwise addition and a carry output, wherein each elementary adder other than the elementary adder in the least significant bit position is configured to perform a bitwise addition between a component of the first operand at said given bit position and the corresponding component of the second operand at said given bit position using the carry generated by the bitwise addition performed by the elementary adder corresponding to a previous bit position, a result of the arithmetic addition operation being derived from the sum outputs provided by each elementary adder, wherein the device is configured to apply a mask to each operand component input of at least some of the elementary adders using a masking logical operation, and wherein a same mask is applied to each elementary adder.

2. The cryptographic system of claim 1, wherein said mask is random.

3. The cryptographic system of claim 1, wherein the masking logical operation used to apply a mask to each operand component input is a XOR logic operation between said mask and said operand component input.

4. The cryptographic system of claim 1, wherein each elementary adder is a full adder.

5. The cryptographic system of claim 1, wherein each elementary adder is a carry look-ahead adder.

6. A method, implemented in a cryptographic system, for executing a cryptographic operation on bit vectors, by a device comprising a set of elementary adders in said cryptographic system, the cryptographic operation being related to a cryptographic mechanism, the execution of said cryptographic operation, by said device, comprising the execution of at least one arithmetic addition operation between a first operand and a second operand, each operand being an integer of a given bit size and representing a bit vector, each operand comprising a set of components, each component corresponding to a given bit position of the operand, each elementary adder being associated with a given bit position of the operands, the method comprising, for each bit position of the operands, other than a least significant bit position, performing, by the elementary adder associated with said bit position, a bitwise addition providing a sum output and a carry output, wherein the step of performing a bitwise addition comprises, for each bit position of the operands, other than the least significant bit position, performing a bitwise addition between a component of the first operand at said bit position and the corresponding component of the second operand at said bit position, using the carry generated by the bitwise addition of the bit components of the operand at a previous bit position, a result of the arithmetic addition operation being derived from the sum outputs provided by each elementary adder, the step of performing a bitwise addition previously comprising applying a mask to each operand bit component using a masking logical operation, wherein a same mask is applied to each elementary adder.

7. The method of claim 6, wherein said mask is a random number.

8. A cryptographic system comprising a device for executing a cryptographic operation on bit vectors, the execution of said cryptographic operation comprising the execution of at least one arithmetic addition operation between a first operand and a second operand, each operand being an integer of a given bit size and representing a bit vector, each operand comprising a set of components, each component corresponding to a given bit position of the operand, the device comprising a set of elementary adders, each elementary adder being associated with a given bit position of the operands, wherein each elementary adder other than the elementary adder in a least significant bit position has a sum output corresponding to a bitwise addition and a carry output, wherein each elementary adder other than the elementary adder in the least significant bit position is configured to perform a bitwise addition between a component of the first operand at said given bit position and the corresponding component of the second operand at said given bit position using the carry generated by the bitwise addition performed by the elementary adder corresponding to a previous bit position, a result of the arithmetic addition operation being derived from the sum outputs provided by each elementary adder, wherein the device is configured to apply a mask to each operand component input of at least some of the elementary adders using a masking logical operation, wherein the device is configured to apply different masks to sequences of elementary adders, each sequence comprising connected elementary adders, wherein said set of elementary adders comprises at least two sequences of elementary adders, a different mask being applied to each sequence of elementary adders, and wherein the device comprises a mask switching unit arranged between the output of a previous sequence of elementary adders which is applied a mask and the input of a next sequence of elementary adders, and wherein the mask switching unit is configured to apply a new mask to the next sequence of elementary adders and to provide the carry output of the last elementary adder of the previous sequence of elementary adders, to a first elementary adder of the next sequence of elementary adders.

9. The cryptographic system of claim 8, wherein the mask switching unit comprises at least two XOR logical gates.

10. The cryptographic system of claim 9, wherein the mask switching unit comprises at least two XOR logical gates, a first XOR logical gate comprising a first XOR logical gate configured to receive the new mask and the carry output of the last elementary adder of a previous set of elementary adders, a second XOR logical gate receiving the mask of the previous set of elementary adders and the output of the first XOR logical gate, the output of the second XOR logical gate being connected to the input of a first elementary adder of a next set of elementary adders.

11. The cryptographic system of claim 8, wherein the masking logical operation used to apply a mask to each operand component input is a XOR logic operation between said mask and said operand component input.

12. The cryptographic system of claim 8, wherein each elementary adder is a full adder.

13. The cryptographic system of claim 8, wherein each elementary adder is a carry look-ahead adder.

14. A method, implemented in a cryptographic system, for executing a cryptographic operation on bit vectors, by a device comprising a set of elementary adders in said cryptographic system, the cryptographic operation being related to a cryptographic mechanism, the execution of said cryptographic operation, by said device, comprising the execution of at least one arithmetic addition operation between a first operand and a second operand, each operand being an integer of a given bit size and representing a bit vector, each operand comprising a set of components, each component corresponding to a given bit position of the operand, each elementary adder being associated with a given bit position of the operands, the method comprising, for each bit position of the operands, other than a least significant bit position, performing a bitwise addition, by the elementary adder associated with said bit position, providing a sum output and a carry output, wherein the step of performing a bitwise addition comprises, for each bit position of the operands, other than the least significant bit position, performing a bitwise addition between a component of the first operand at said bit position and the corresponding component of the second operand at said bit position, using the carry generated by the bitwise addition of the bit components of the operand at a previous bit position, a result of the arithmetic addition operation being derived from the sum outputs provided by each elementary adder, the step of performing a bitwise addition previously comprising applying a mask to each operand bit component using a masking logical operation, wherein the method comprises applying different masks to sequences of elementary adders, each sequence comprising connected elementary adders, wherein a different mask is applied to each sequence of elementary adders, and wherein the method comprises applying a mask to a previous sequence of elementary adders, and applying, by a mask switching unit, a new mask to the next sequence of elementary adders and providing the carry output of the last elementary adder of the previous sequence of elementary adders, to a first elementary adder of the next sequence of elementary adders.

* * * * *